(12) United States Patent
Crumm et al.

(10) Patent No.: US 8,936,888 B2
(45) Date of Patent: Jan. 20, 2015

(54) FUEL CELL SYSTEM WITH FLAME PROTECTION MEMBER

(75) Inventors: Aaron T. Crumm, Ann Arbor, MI (US); Timothy LaBreche, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 664 days.

(21) Appl. No.: 12/698,033

(22) Filed: Feb. 1, 2010

(65) Prior Publication Data

US 2011/0189572 A1  Aug. 4, 2011

Related U.S. Application Data

(60) Provisional application No. 61/206,456, filed on Jan. 30, 2009.

(51) Int. Cl.
*H01M 8/02* (2006.01)
*H01M 8/04* (2006.01)
*H01M 8/06* (2006.01)
*H01M 8/12* (2006.01)
*H01M 8/24* (2006.01)
*H01M 4/70* (2006.01)

(52) U.S. Cl.
CPC . *H01M 8/04* (2013.01); *Y02E 60/50* (2013.01)
USPC .......... 429/512; 429/434; 429/441; 429/452; 429/466; 429/495; 429/497

(58) Field of Classification Search
USPC ......... 429/434, 441, 452, 466, 495, 497, 512, 429/517
See application file for complete search history.

(56) References Cited

U.S. PATENT DOCUMENTS

| | | | |
|---|---|---|---|
| 3,065,537 A | 11/1962 | Patriarca et al. |
| 3,124,487 A | 3/1964 | Duddy |
| 4,278,584 A | 7/1981 | Noguchi et al. |
| 4,374,184 A | 2/1983 | Somers et al. |
| 4,728,584 A | 3/1988 | Isenberg |
| 5,273,839 A | 12/1993 | Ishihara et al. |
| 5,496,655 A | 3/1996 | Lessing |
| 5,686,198 A | 11/1997 | Kuo et al. |
| 6,348,278 B1 | 2/2002 | Lapierre et al. |
| 6,562,496 B2 | 5/2003 | Faville et al. |
| 6,602,626 B1 | 8/2003 | Allen |
| 6,677,066 B1 | 1/2004 | Jansen et al. |

(Continued)

FOREIGN PATENT DOCUMENTS

DE   19907369 A1   8/2000

OTHER PUBLICATIONS

FS100UMJ data sheet.

(Continued)

*Primary Examiner* — Sean P Cullen
(74) *Attorney, Agent, or Firm* — Endurance Law Group, PLC

(57) ABSTRACT

A solid oxide fuel cell system includes a first fuel cell tube, a flame tip protection member and a current conduction member. The first fuel cell tube has a flame end. The flame end has exit opening. The fuel cell tube is configured to deliver combustible gas to the flame tip region generating a flame kernel. The flame protection member is configured to inhibit at least one of mass transfer and heat transfer between the fuel cell tube and the flame tip region. The current conduction member is disposed through the exit opening of the flame end of the first fuel cell tube.

16 Claims, 11 Drawing Sheets

(56) References Cited

U.S. PATENT DOCUMENTS

| | | |
|---|---|---|
| 7,229,712 B2 | 6/2007 | Eshraghi et al. |
| 7,374,835 B2 | 5/2008 | Kendall et al. |
| 7,629,069 B2 | 12/2009 | Finnerty |
| 2003/0003332 A1 | 1/2003 | Sederquist et al. |
| 2003/0138683 A1 | 7/2003 | Bai et al. |
| 2003/0143445 A1 | 7/2003 | Daniel et al. |
| 2003/0162067 A1 | 8/2003 | McElroy |
| 2004/0048120 A1 | 3/2004 | Haltiner et al. |
| 2004/0115503 A1 | 6/2004 | Jacobson et al. |
| 2004/0202900 A1 | 10/2004 | Pavio et al. |
| 2005/0026028 A1 | 2/2005 | Ouchi et al. |
| 2005/0112452 A1 | 5/2005 | Crumm et al. |
| 2005/0123810 A1 | 6/2005 | Balan |
| 2005/0123813 A1 | 6/2005 | Matoba et al. |
| 2005/0208363 A1* | 9/2005 | Taylor et al. .................. 429/38 |
| 2005/0233187 A1 | 10/2005 | Pastula et al. |
| 2005/0266288 A1* | 12/2005 | Zafred et al. .................. 429/26 |
| 2006/0024547 A1 | 2/2006 | Waldbillig et al. |
| 2006/0216540 A1 | 9/2006 | Budinger et al. |
| 2006/0228593 A1 | 10/2006 | Grieve et al. |
| 2007/0141447 A1 | 6/2007 | Crumm et al. |
| 2007/0231631 A1 | 10/2007 | Venkataraman |
| 2007/0243444 A1 | 10/2007 | Zheng et al. |
| 2008/0241612 A1 | 10/2008 | Ballantine et al. |
| 2009/0050680 A1* | 2/2009 | Martin et al. .............. 228/262.9 |
| 2009/0068446 A1 | 3/2009 | Bischof et al. |
| 2009/0176136 A1* | 7/2009 | Poshusta et al. ............... 429/20 |
| 2010/0173208 A1 | 7/2010 | Hatada |

OTHER PUBLICATIONS

MC68HC705P6A data sheet.

Sammes et al., "Design and Fabrication of a 100 W anode supported micro-tubular SOFC stack", 2005, Journal of Power Sources, 145, p. 428-434.

\* cited by examiner

US 8,936,888 B2

FUEL CELL SYSTEM WITH FLAME PROTECTION MEMBER

RELATED APPLICATIONS

This applications claims priority to U.S. Provisional Patent Application No. 61/206,456 filed on Jan. 30, 2009 the entire contents of which is hereby incorporated by reference herein.

GOVERNMENT INTERESTS

This invention was made with government support under contract number W909MY-08-C-0025, awarded by the Department of Defense. The government has certain rights in this invention.

FIELD OF THE DISCLOSURE

This disclosure relates to fuel cells and more particularly to thermal management of fuel cells.

BACKGROUND

Solid oxide fuel cell systems include solid oxide fuel cells (SOFCs) configured to react a fuel gas and an oxidant on opposite sides of an electrolyte to generate DC electric current. SOFCs have an anode, an electrolyte and a cathode, and can be made from a variety of materials and in a variety of geometries. The solid oxide fuel cell systems can convert hydrocarbon fuels to a suitable fuel gas containing carbon monoxide (CO) and hydrogen ($H_2$), wherein carbon monoxide and hydrogen gas are then oxidized at an active area of the SOFC to carbon dioxide and water, to generate DC current. Non hydrocarbon fuels such as ammonia ($NH_3$) can also be converted to SOFC fuel using one or more catalytic reactions.

Fuel gas within the solid oxide fuel cell systems is routed to an anode chamber, where the fuel gas reacts with the anode of the SOFC. The operating temperatures of the SOFC is in the range of about 600-950° C. The anode chamber contains low levels of oxygen and therefore, combustion of the fuel gas does not occur to a great extent within the anode chamber. Exhaust gas that includes products of the anode reaction along with unreacted fuel exit the anode chamber through an exhaust outlet. When the exhaust gas exits the exhaust outlet, the unreacted fuel interacts with oxygen present outside the anode chamber, resulting in a combustion reaction. The region at which this combustion reaction takes place is referred to as a flame tip region. The flame tip region comprises an environment with a variable oxidation potential (reducing to oxidative) that is significantly higher than the temperatures present at the anode surface and the cathode surface of the fuel cell, i.e., above the range of about 600-950° C.

The high temperatures of the flame tip region can have an undesirable affect on materials exposed to the high temperatures. For example, fuel cell system components utilized to electrically connect electrodes of individual component cells within a fuel cell stack may comprise materials such as silver or silver alloys, which melt at the temperatures in the range of the temperatures present proximate to the flame tip region. Further, metallic solid oxide fuel cell anodes exposed to the high temperature oxidative environment of the flame tip region will oxidize resulting in irreversible degradation to the fuel cell anode material.

Therefore, it is desirable to control the location of the flame tip region within a fuel cell system.

SUMMARY

Figure 1:
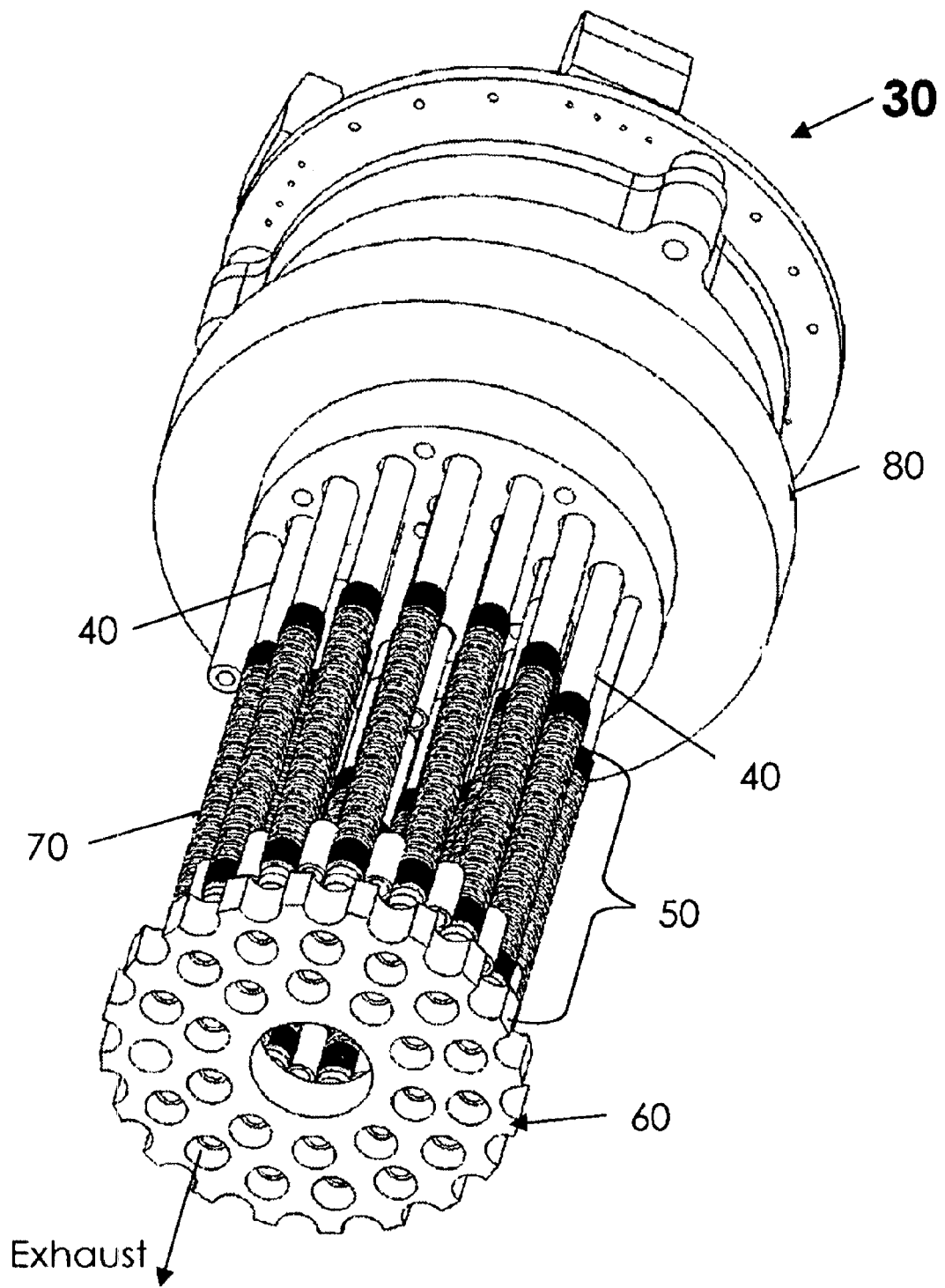
FIG. 1 depicts a prospective view of a fuel cell system in accordance with an exemplary embodiment of the present disclosure.

A solid oxide fuel cell system includes a first fuel cell tube, a flame tip protection member and a current conduction member. The first fuel cell tube has a flame end. The flame end has an exit opening. The fuel cell tube is configured to deliver combustible gas to the flame tip region generating a flame kernel. The flame protection member is configured to inhibit at least one of mass transfer and heat transfer between the fuel cell tube and the flame tip region. The current conduction member is disposed through the exit opening of the flame end of the first fuel cell tube.

A solid oxide fuel cell system includes a first fuel cell tube and a flame tip protection member. The first fuel cell tube has a flame end with an exit opening. The fuel cell tube is configured to deliver combustible gas to a flame tip region generating a flame kernel. The flame protection member is configured to inhibit heat transfer between the fuel cell tube and the flame tip region by modifying one of an exhaust flow speed and an exhaust flow direction.

DESCRIPTION OF THE EMBODIMENTS

The present disclosure generally relates to flame protection members for solid oxide fuel cell systems. In the solid oxide fuel cell system, fuel is introduced into an anode chamber of the fuel cell. The anode chamber contains levels of oxygen that are sufficiently lower such that fuel and oxygen do not produce a combustion reaction inside the anode chamber at the fuel cell operating temperatures. However, some of the fuel is not reacted inside the anode chamber and the unreacted fuel is routed outside the anode chamber. The atmosphere outside the anode chamber has sufficiently high levels of oxygen such that when the unreacted fuel significantly intermixes with the oxygen outside the anode chamber, the unreacted fuel reacts with the oxygen in a combustion reaction at operating temperatures. The flame tip region is the region at which this combustion reaction occurs.

The flame protection member is provided to protect fuel cell components from the high temperatures of the flame tip region. In one embodiment, the flame protection member can protect fuel cell components by providing a physical barrier between the flame tip region and the fuel cell components. The physical barrier can provide an oxygen barrier to substantially prevent oxygen transport to the fuel component and can provide a thermal barrier to thermally insulate the fuel cell component. In one embodiment, the flame protection member can protect the fuel cell tube from heat and oxidative gases of the flame tip region. For example, the flame tip protection member can protect the nickel in the anode from the high temperature oxidizing environment of the flame tip region by providing a physical barrier to substantially prevent oxygen molecule transport from the flame tip region to the anode. In one embodiment, the flame protection member can protect portions of a current conducting member that interconnects an electrode of a first fuel cell tube and an electrode of a second fuel cell tube. For example the flame protection member can include a conduit to allow the current conducting member to be routed in a path that does not intersect the flame tip region. In one embodiment, the flame protection member can extend from the anode chamber such that the flame tip region is a sufficient distance from the fuel cell anode to substantially prevent the degradation of the fuel cell anode due to the high temperatures and high oxygen levels of the flame tip region.

In one embodiment, the flame protection member can protect the fuel cell components by modifying the mass flux and the flow direction of the exhaust stream to control the location of the flame tip region. For example, the flame protection member can change the flow direction from a direction substantially perpendicular to the fuel cell tube to a second direction. Further, the flame protection member can change a unit area, for example, a cross sectional area that the exhaust stream is routed through thereby increasing the mass flux rate of the exhaust stream. As mass flux rate increases, oxygen-fuel mixing level versus distance from an exhaust outlet opening of the anode chamber decreases. Since fuel ignites to create the flame tip region only after a selected level of oxygen/fuel mixing occurs, increasing the mass flux level, increases the distance between the exhaust outlet opening and the flame tip region.

In one embodiment, the flame protection member can protect fuel cell components by dispersing fuel thereby increasing the size of the flame tip region, while decreasing the intensity of heat produced within the flame tip region. In one embodiment, openings at the exhaust outlet are below a critical size, thereby preventing propagation of the flame kernel therethrough.

The flame protection member can provide further functionality beyond protecting the fuel cell system components from the flame tip region. For example, the flame protection member can provide current takeoff for fuel cell electrons and can provide structural support for fuel cell tubes.

Figure 2:
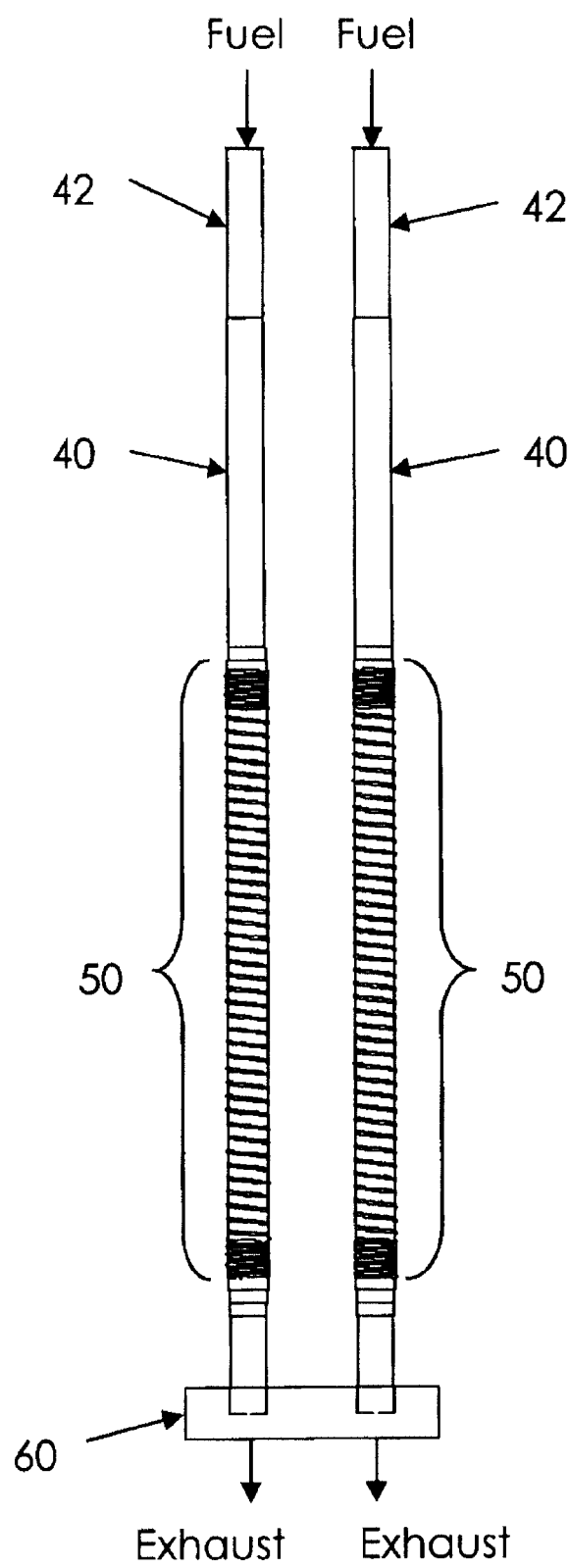
FIG. 2 depicts a prospective view of a portion of the fuel cell system of FIG. 1.

FIG. 1 depicts an exemplary fuel system 30 comprising fuel cell tubes 40, fuel feed tube 42, a flame protection member 60, and a current conducting system 70 electrically connecting the fuel cell tubes 40. FIG. 2 depicts a prospective view and FIG. 3 depicts a cross sectional view of a portion of the fuel cell system 30.

Figure 3:
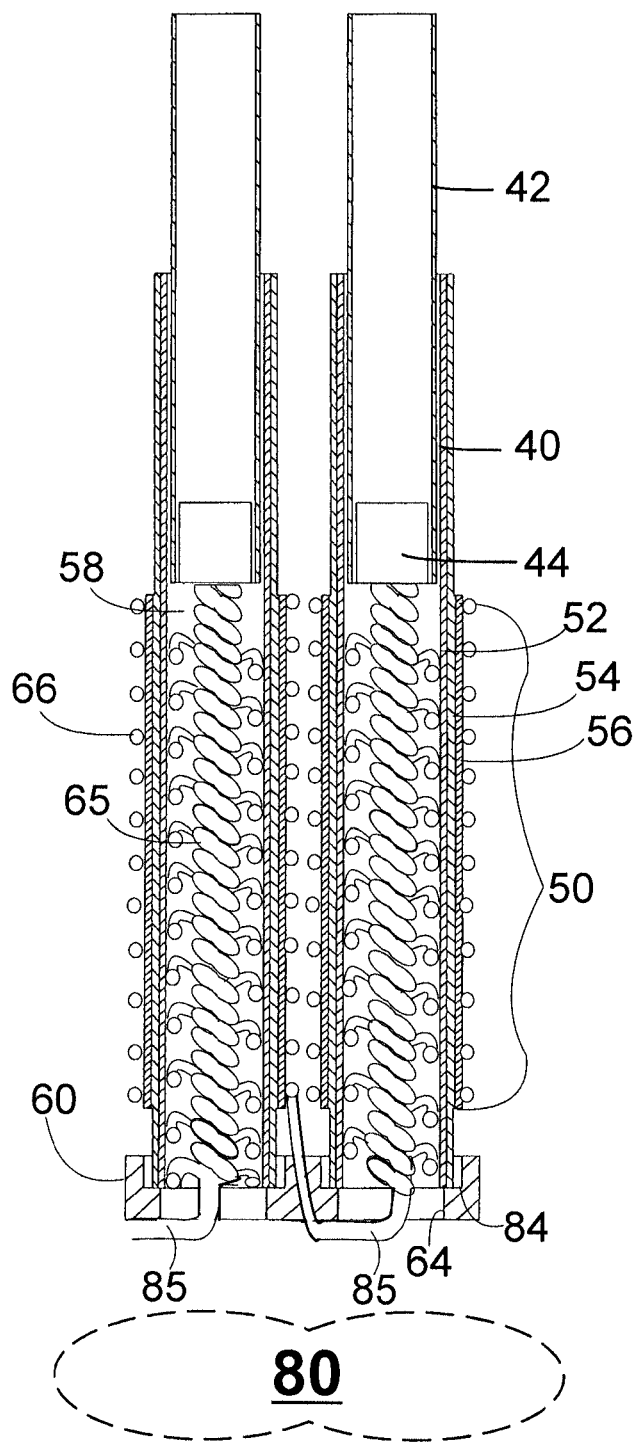
FIG. 3 depicts a cross sectional view of the portion of the fuel cell system of FIG. 2.

Referring to FIGS. 1 and 3, the current conducting member 70 includes an anode current collector 65, an interconnect member 85, and a cathode current collector 66. In an exemplary fuel cell system 30, the fuel cells are arranged in a series connection of fuel cells 40 producing DC power at a voltage which is a sum of the potential of the individual fuel cells. Alternatively, fuel cell electrodes can be connected in parallel or in a combination with some electrodes connected in series and some electrodes in parallel.

The fuel cells 40 comprise an anode layer 52 and an electrolyte layer 54 on an exterior surface of the anode layer 52. The fuel cells 40 further comprises a cathode layer 56 disposed on a portion of the electrolyte layer 54 to define an active area 50. The active area 50 comprises the portion of the fuel cell 40 at which electromotive force is generated across the electrolyte 54 and current is generated at an active portion of the anode layer 52. Each of the fuel cells 40 further comprise a fuel feed tube 42 having an internal reformer 44 disposed therein.

In an exemplary embodiment, the fuel cells are advantageously relatively light in weight, and provide good power density to mass ratios. As an example of a lightweight design each tube can comprise a 1 mm-20 mm diameter tube. Thin, lightweight tubes are also advantageous in that the tubes hold less heat, allowing the fuel cell to be heated rapidly. Other material combinations for the anode, electrolyte and cathode, as well as other cross section geometries (triangular, square, polygonal, etc.) will be readily apparent to those skilled in the art given the benefit of this disclosure.

Each fuel cell 40 defines an anode chamber 58 therein and includes openings at a fuel inlet end ('FUEL') and an exhaust end 84 ('EXHAUST'). In an exemplary embodiment, the active area 50 is disposed in closer proximity to the exhaust opening than the fuel inlet opening, so that fuel is routed the length of the fuel cell 40 and through fuel reforming reactor 42 prior to being provided to the active area 50.

In general, the anode layer 52 and the cathode layer 56 are formed of porous materials capable of functioning as an electrical conductor and capable of facilitating the appropriate reactions. The porosity of these materials allows dual directional flow of gases (e.g., to admit the fuel or oxidant gases and permit exit of the byproduct gases). The anode layer 52 comprises an electrically conductive cermet that is chemically stable in a reducing environment. In an exemplary embodiment, the anode comprises a conductive metal such as nickel, disposed within a ceramic skeleton, such as yttria-stabilized zirconia. The cathode layer 56 comprises a conductive material chemically stable in an oxidizing environment. In an exemplary embodiment, the cathode layer 56 comprises a perovskite material and specifically lanthanum strontium cobalt ferrite. In an alternative exemplary embodiment, the cathode layer 56 comprises lanthanum strontium manganite (LSM).

The electrolyte layer 54 comprises a dense layer preventing molecular transport, therethrough. Exemplary materials for the electrolyte layer 54 include zirconium-based materials and cerium-based materials such as yttria-stabilized zirconia and gadolinium doped ceria, and can further include various other dopants and modifiers to affect ion conducting properties. The anode layer 52 and the cathode layer 56, which form phase boundaries with the electrolyte layer 54, are disposed on opposite sides of the electrolyte layer 54 with respect to each other.

The fuel reforming reactor 44 is disposed within the fuel feed tube 42 positioned within the anode chamber 58 and spaced upstream (as defined by flow of fuel gas) from and proximate to the active area 50. In one embodiment, the fuel feed tube 42 comprises a dense ceramic material such as alumina and zirconia. The fuel reforming reactor 44 reforms hydrocarbon fuel to hydrogen by catalyzing a partial oxidizing reaction between the hydrocarbon and oxygen. In an exemplary embodiment, the fuel reforming reactor 44 comprises a supported catalyst. The supported catalysts includes of very fine scale catalyst particles supported on a substrate. Preferably the catalytic substrate is honeycomb shaped, provided with a series of openings which the fuel gas passes through as the partial oxidation reaction is catalyzed. The fuel reforming reactor 42 can comprise, for example, particles of a suitable metal such as platinum or other noble metals such as palladium, rhodium, iridium, osmium, or their alloys disposed on a substrate which can comprise oxides (such as aluminum oxide), carbides, and nitrides such. In other embodiments, the catalytic substrate can include a wire, a porous bulk insert of a catalytically active material, or a thin "ribbon" which having a high surface area to volume ratio or the fuel reforming reactor can comprise a packed bed of catalytic substrate beads. Other materials suitable for use as a catalytic substrate will be readily apparent to those skilled in the art given the benefit of this disclosure. The fuel feed tube 42 routes bulk fuel flow in a generally uniform direction past the fuel reforming reactor 44 such that substantially all the raw fuel is catalyzed within the fuel reforming reactor prior to contacting the anode layer 52.

The cathode current collector 66 is disposed around the fuel cells 40, preferably at or near the active area 50 to capture electric current generated when the oxidizing gases react at the cathode layer 56. An exemplary cathode current collector 66 comprises at least one wire which has a linear segment extending parallel to the longitudinal axis of the tube and a spiral segment wrapped around the linear segments to maintain contact between the linear segments to the cathode layer 56 and to collect current generated circumferentially at the cathode layer 56. The cathode current collector 66 can comprise, for example, fine gauge wire allowing the wires to be somewhat flexible. A single large gauge wire may be too stiff, as it is advantageous to allow for some play in the fuel cell to absorb energy when subjected to irregular stresses. Irregular stresses and shock loading would be expected with a portable, lightweight solid oxide fuel cell. An example of a suitable wire for use in such cathode current collector is 250 micron silver wire. In other embodiments, the wires of the cathode current collector 66 can comprise high temperature metals or metal alloys having oxidation resistance at 600 to 950° C. examples of which include for example platinum, palladium, gold, silver, iron, nickel and cobalt-based materials. In general, it is desirable to reduce ohmic loss and cathode overpotential. Further, the cathode current collector 66 is electrically conductive (so that electrons generated as a result of the electrochemical reaction of the fuel cell 40 can be collected) and permeable to oxygen (so that oxygen can reach the active area and enter the electrochemical reaction). In an exemplary embodiment, a contact layer is disposed at an interface between the cathode current collector 66 and the cathode layer 56 that functions to reduce ohmic loss and cathode overpotential. In an exemplary embodiment, the contact layer is applied as a layer about 10 to 40 microns thick prior to positioning the cathode current collector 66 around the cathode layer 56. In an exemplary embodiment, the contact layer comprises gold. In an alternative embodiment, a contact layer disposed between the cathode and the cathode current collector can comprise a perovskite material. The cathode current collector 66 is exposed to air (oxygen) and high temperatures, and therefore, must maintain high conductivity at these temperatures.

The anode current collector 65 comprises a wire brush having an inner portion and a plurality of loop members extending therefrom. The wire diameters may preferably be set so that the wires fit snugly inside the tube to promote good electrical contact with that anode while leaving space between the wires for the passage of gas. The anode current collector 65 comprises an electrically conducting metal. Since the wires are positioned in the processed fuel gas, the anode current collector 65 is formed from material that maintains conductivity in the operating environment of the anode chamber 58. In exemplary anode chamber 58, the oxygen level, the reducing gas level, and the operating temperature maintain an environment providing sufficiently low rates of copper oxidation such that the anode current collector 65 can comprise copper or a copper alloy.

An anode contact layer (not shown) can physically and electrically connect the anode layer 52 to the anode current collector 65. The anode contact layer is porous to allow the fuel gas to be routed therethrough and can comprise, for example, a paint containing copper oxide which is applied to the wire or wires of the anode current collector 65 prior to insertion into the anode chamber 58. Upon heating in the fuel gas atmosphere, the copper oxide particles in the paint reduce to copper metal, creating a porous sintered metal contact between the anode current collector and the anode layer 52. Other materials suitable for creating a porous contact include metal oxides such as nickel oxide and metallic sinter bonded materials.

The interconnect member 85 electrically and physically couples the anode current collector 65 to the cathode current collector 66. In other embodiment, the interconnect member can electrically and physically couple an anode current collector to another anode current collector or a cathode current collector to another cathode current collector in parallel configurations. The interconnect member 85 is disposed through the exhaust opening, wherein exhaust from the fuel cell anode chamber 58 comprising unspent fuel comprising one or more fuel species with oxygen containing air disposed outside the fuel cell anode chamber 58. When the heated exhaust stream sufficiently interacts with oxygen, the unspent fuel from the exhaust stream is oxidized in a combustion reaction in a region proximate the exhaust opening known as the flame tip region. The interconnect member 85 may be formed of a conductive material compatible with the thermal and chemical environment can comprise gold, platinum, palladium, noble metals or alloys, and oxidation resistant alloys of iron, nickel or cobalt. In one exemplary embodiment, the anode current collector 65 comprises a nickel wire. In an alternate exemplary embodiment, comprises a clad wire having a conductive metal inner core. Exemplary metals for the conductive metal inner core include silver, copper, nickel, iron, and cobalt along with alloys comprising at least one of the foregoing metals.

Each fuel cell tube 40 is disposed within a recessed portion of the flame protection member 60 so that a surface at the exhaust end of the fuel cell tube 40 is positioned against a ledge portion 64 of the flame protection member 60. Each fuel cell tube 40 is disposed within the flame protection member 60 such that a flame tip extending portion is positioned between the anode layer 52 and the flame tip region 80.

The flame tip member 60 provides a physical barrier to prevent oxygen transport and a thermal barrier between the flame tip region 80 and the anode layer 52 of the fuel cell tube 40. The exemplary flame protection member 60 provides structural support to the fuel stack 30 and specifically maintains the position of the fuel cell tubes 40 within the fuel cell system 30.

In one embodiment, the flame protection member 60 comprises a high temperature ceramic material, for example, alumina, and zirconia materials.

In one embodiment, the flame protection member 60 comprises a metal. For example, the flame protection member 60 can comprise high temperature alloys such as high temperature stainless steel, for example 400 series or 600 sereis stainless steel. Further, the flame protection member 60 can comprise other metals such as high temperature. austenitic nickel and chromium containing super alloy materials that are commonly known in the art.

The flame tip protection member can comprise a single body utilized for multiple fuel cell tubes, or can comprise multiple members, wherein one member is utilized for each fuel cell tube. The flame tip protection member can comprise exit hole.

In one embodiment, the exit holes can modify an exhaust gas velocity to direct combustion to a desired location. In one embodiment, the exit holes can direct a flame to a location detached from the fuel cell tube 40. In one embodiment, the exit holes modifies the exhaust gas velocity to prevent back flow into the anode chamber 58. In one embodiment, the exit holes direct a flame away from current collecting wires.

The flame tip protection member can include a positive stop portion to provide for correct placement during assembly. The flame tip protection member can comprise a stamped member, for example a cup-shaped member stamped from stainless steel stock material. In an alternate embodiment, the flame tip protection member can comprise an extruded tube.

In one embodiment, a joining material (not shown) can be disposed between fuel cell tube 40 and the flame protection member 90 to bond the fuel cell tube 40 to the flame protection member 90. The joining material can comprise material capable of bonding the material of the flame protection member to the fuel cell tube. The precise composition of the joining material can vary based on the fuel cell tube 40 composition and the flame protection member 90 composition. In an exemplary embodiment, the joining material comprises braze material. In alternative embodiments, the joining material can comprise ceramic material such as alumina, silica, and zirconia materials. Further in alternative embodiments, the flame protection member 60 cai be bonded can be mechanically joined to the fuel cell tube 40 utilizing for example, a pressure fit, fastening members (utilizing, for example, the interconnect member), and the like.

Figure 4:
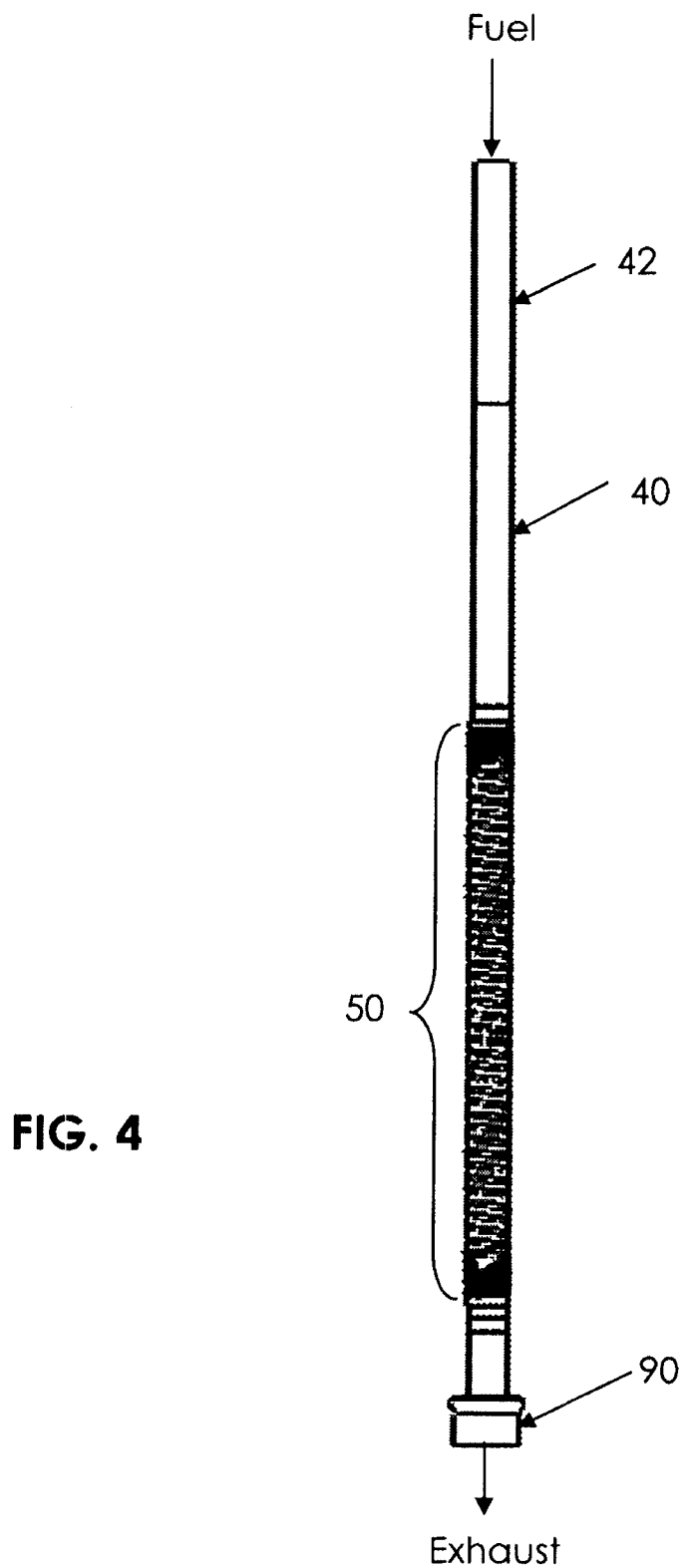
FIG. 4 depicts a prospective view of a portion of a fuel cell system in accordance with another exemplary embodiment of the present disclosure.
Figure 5:
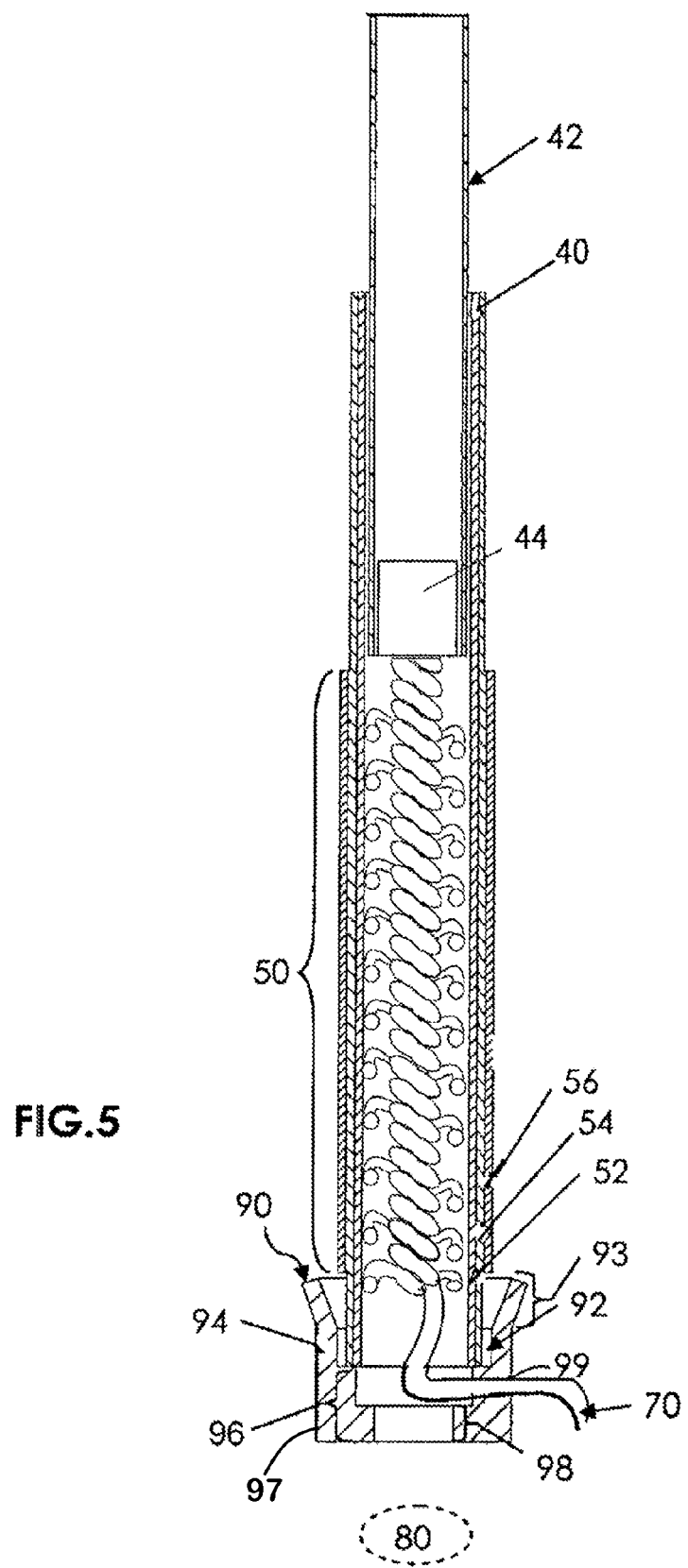
FIG. 5 depicts a cross sectional view of the portion of the fuel cell system in accordance with the exemplary embodiment of FIG. 4.

Referring to FIGS. 4 and 5, a flame protection member 90 in accordance with another exemplary embodiment is depicted. The flame protection member 90 is bonded to the fuel cell tube 40 via the joining member 92, and the flame protection member 90 includes an insertion flange 93, a ledge portion 96, and a flame tip extender 97. The current conducting system of the fuel cell 40 comprises a wire routed through a conduit 99 disposed through a side of the flame protection member 90.

In an alternate embodiment, the flame tip extender 97 can include any of several types of slots, notches, cuts, holes, or other design features to allow an interconnect portion of a current conducting system to conduct electricity between electrodes of different fuel cell tubes.

Tolerances between the current collector wire and the slot in the flame tip extender must be such that the majority of the exhaust gas exits through the exhaust port thereby protecting the wire.

The fuel cell tube 40 is disposed within recessed portions 96 of the flame protection member 90 such that a surface at the exhaust end 84 of the fuel cell tube 40 is positioned against a ledge portion 94 of the flame protection member 90. A joining member 92 is disposed between fuel cell tube 40 and the flame protection member 90 to bond the fuel cell tube 40 to the flame protection member 90. Each fuel cell tube 40 is disposed within the flame protection member 90 such that a flame tip extending portion 97 is disposed between the anode layer 52 and the flame tip region 80.

The flame tip extending portion 97 provides a physical barrier to prevent oxygen transport and a thermal barrier between the flame tip region 80 and the anode layer 52 of the fuel cell tube 40. The flame tip extending portion 97 comprises an inner circumference defining a mass flux accelerating region 98. The mass flux accelerating region 98 comprises a region having a smaller cross sectional area than the inner diameter of the fuel cell tube 40 and therefore, the flame protection member 90 decreases the cross sectional area that the exhaust stream is routed through thereby increasing the mass flux of the exhaust stream. The increased mass flux rate decreases oxygen-fuel mixing versus distance from the exhaust opening. Since the flame ignites to create the flame tip region only after a selected level of oxygen/fuel mixing occurs, increasing mass flux accelerating region acts to increase the distance between the exhaust outlet opening and the flame tip region.

Figure 6:
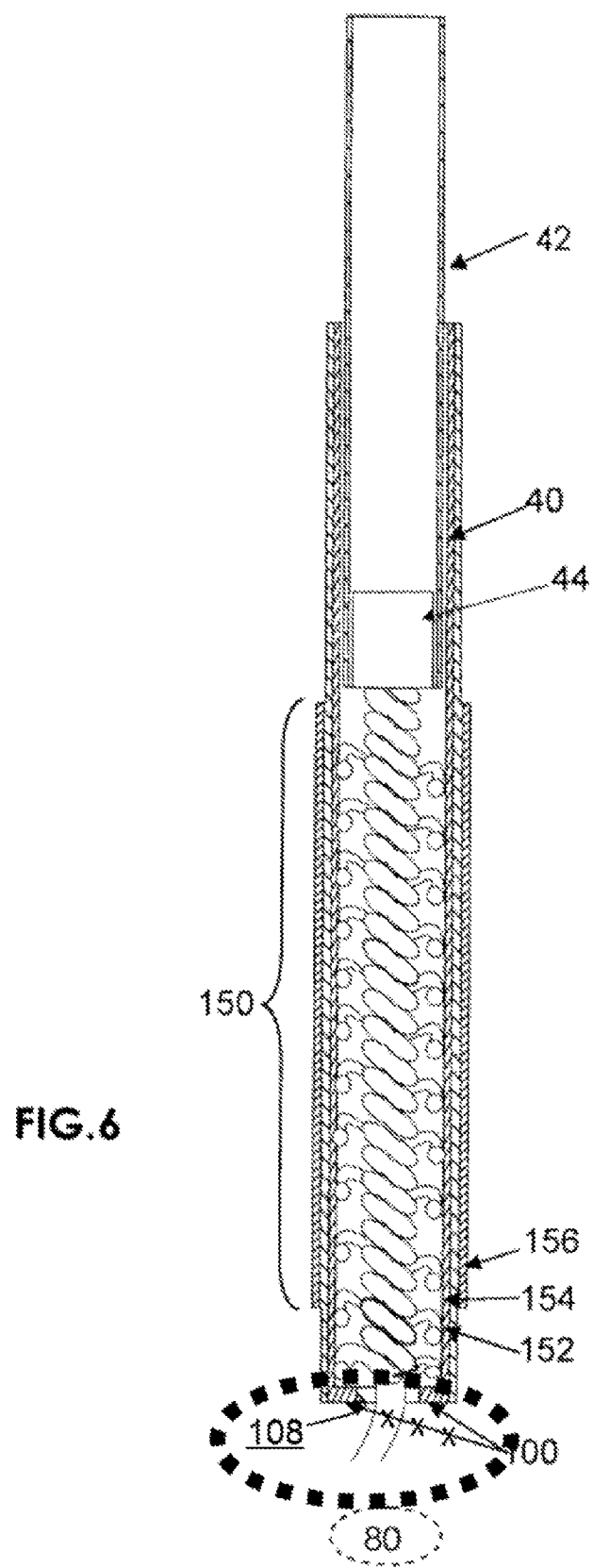
FIG. 6 depicts a cross sectional view of a portion of a fuel cell system in accordance with another exemplary embodiment of the present disclosure.

Referring to FIG. 6, a flame protection member 100 in accordance with another exemplary embodiment is depicted. The flame protection member 100 is integrated with a fuel cell 140. The fuel cell 40 comprising the flame protection member 100 can be formed by, for example, slip casting or by pressure molding a precursor material comprising ceramic powder and plastic binder and then heating the precursor material to sinter the ceramic powder to burn off the plastic binder. The fuel cell further comprises an active area 150 comprising an anode layer 152, an electrolyte layer 154, and a cathode layer 156 that are substantially similar to the anode layer 52, the electrolyte 54, and the cathode layer 56, described above for the fuel cell tube 40.

The flame protection member 100 comprises an inner circumference defining mass flux accelerating region 108. The mass flux accelerating region 108 comprises a region having a smaller cross sectional area than the inner diameter of the fuel cell tube 140 and therefore, the flame protection member 100 decreases cross sectional area that the exhaust stream is routed through thereby increasing the mass flux of the exhaust stream. The increased mass flux rate decreases oxygen-fuel mixing versus distance from the exhaust opening. Since the flame ignites to create the flame tip region only after a selected level of oxygen/fuel mixing occurs, increasing mass flux accelerating region acts to increase the distance between the exhaust outlet opening and the flame tip region.

Figure 7:
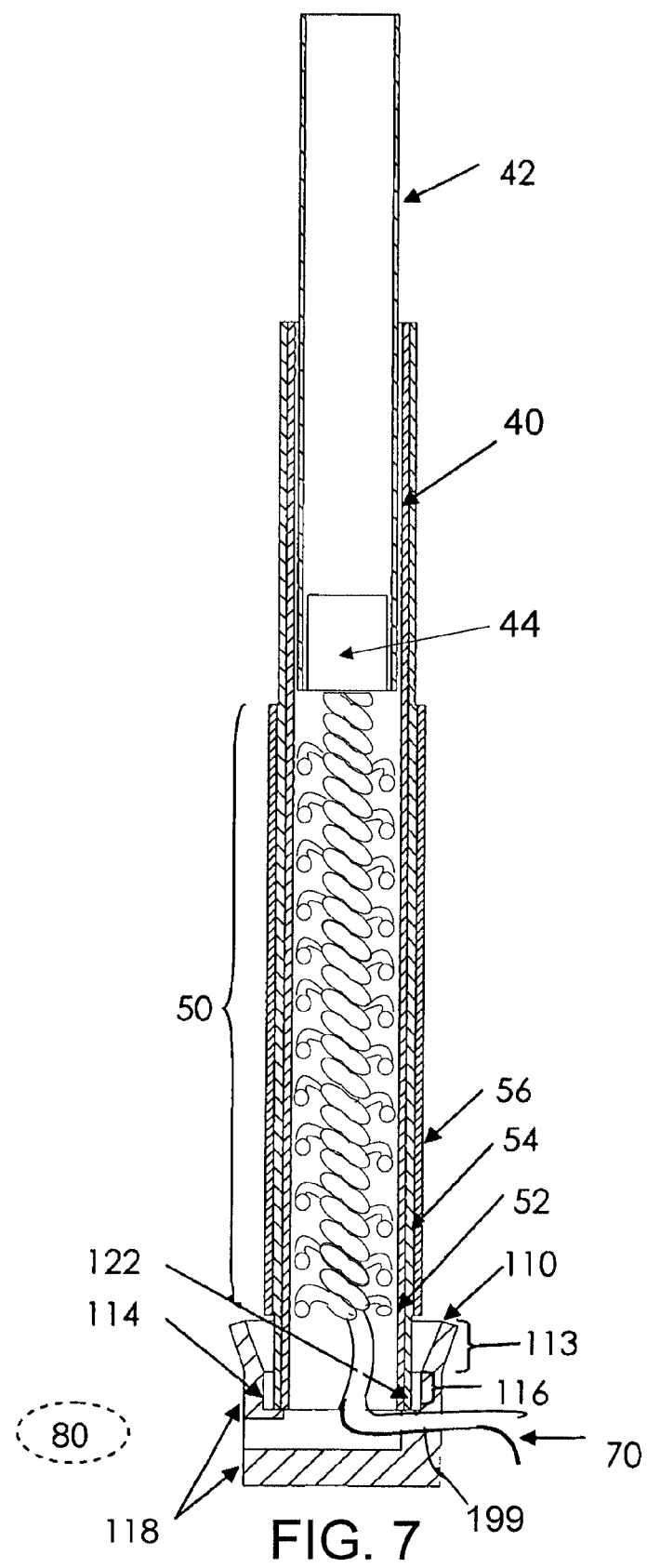
FIG. 7 depicts a cross sectional view of a portion of a fuel cell system in accordance with another exemplary embodiment of the present disclosure.

Referring to FIG. 7, a flame protection member 110 in accordance with another exemplary embodiment is depicted including a flared extension 113. The flame protection member 110 is bonded to the fuel cell tube 40 via the joining member 116, and the flame protection member 110 includes an insertion flange 114, a ledge portion, and a flame tip extending portion 118. The current conducting system of the fuel cell 40 comprises a wire routed through a conduit 199 disposed through a side of the flame protection member 110. In an alternative embodiment, the wire routed through the conduit 199 provides pressure to the fuel flame protection member 110 to maintain the flame protection member against the fuel cell tube 40.

The flame tip extending portion 118 provides a physical barrier to prevent oxygen transport and thermal barrier between the flame tip region 80 and the anode layer 52 of the fuel cell tube 40. Further, the flame tip extending portion 118 defines an exhaust outlet. The exhaust outlet is positioned such that exhaust flux is redirected within the flame protection member 110 and is routed out of the flame protection at angle that is substantially perpendicular to the flow of exhaust out of the fuel cell tube 40. Therefore, the flame tip region 80 propagates from a location that is perpendicular from and not axially aligned with the fuel cell tube 40 as shown in FIG. 7.

Figure 8:
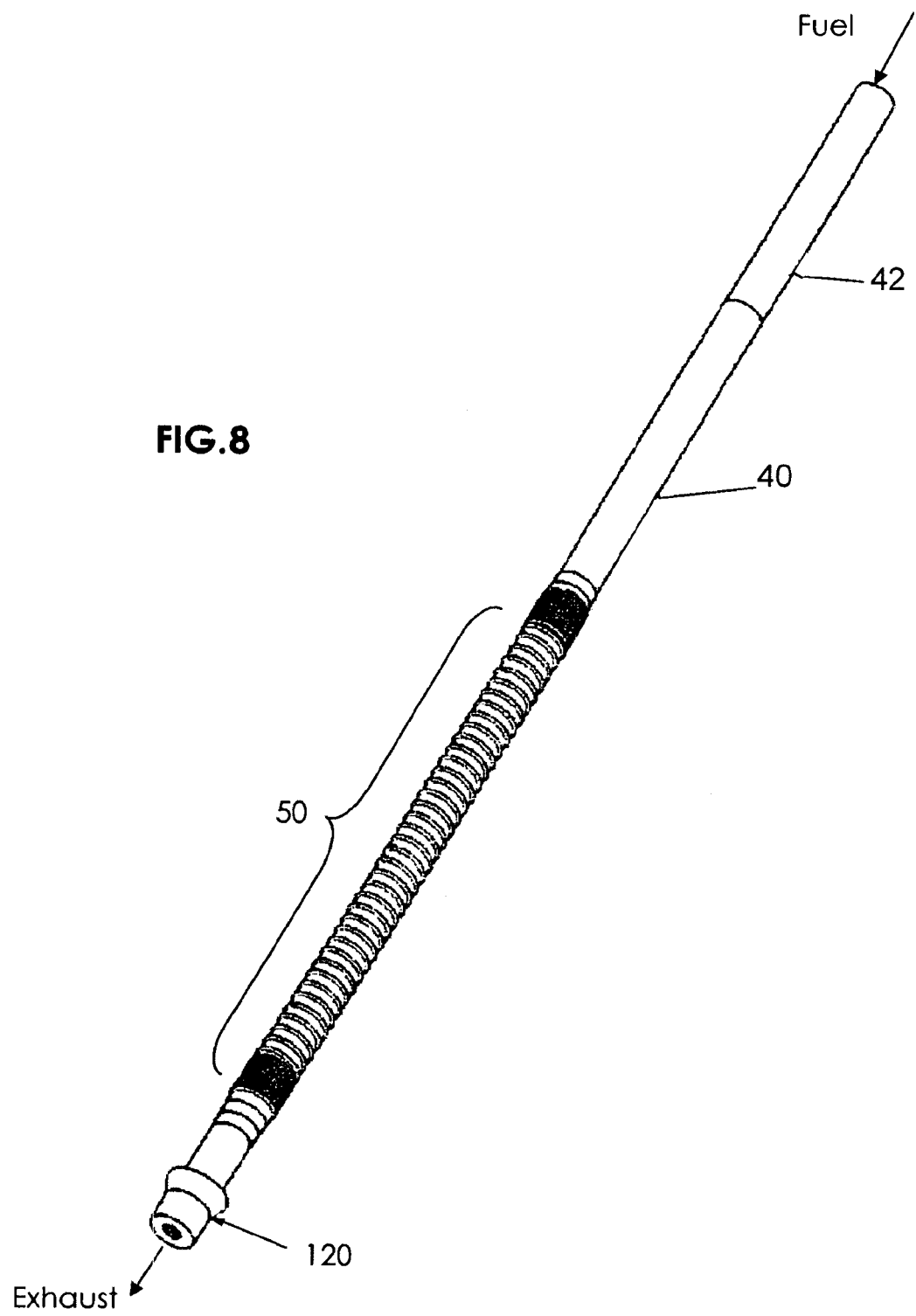
FIG. 8 depicts a prospective view of a portion of a fuel cell system in accordance with another exemplary embodiment of the present disclosure.
Figure 9:
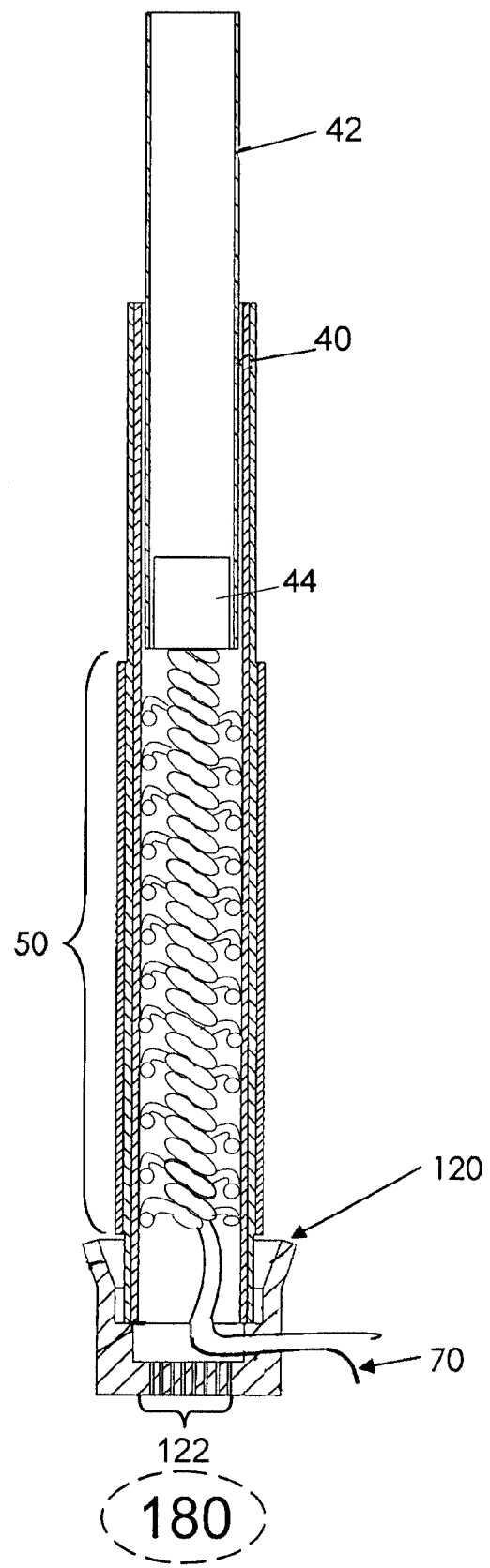
FIG. 9 depicts a cross sectional view of a portion of a fuel cell system in accordance with the exemplary embodiment of FIG. 8.

Referring to FIGS. 8 and 9, a flame protection member 120 in accordance with another exemplary embodiment is depicted. Flame protection member 120 comprises a plurality of output openings 122 for routing exhaust from the fuel cell 40. The output openings 122 decreases a cross sectional area that the exhaust stream is routed through thereby increasing the mass flux of the exhaust stream. The increased mass flux rate decreases oxygen-fuel mixing versus distance from the exhaust opening. Since the flame ignites to create the flame tip region only after a selected level of oxygen/fuel mixing occurs, increasing mass flux accelerating region acts to increase the distance between the exhaust outlet opening and the flame tip region. Further, the outlet opening disperses the fuel gas thereby providing increasing the size of the flame tip region, while decreasing the intensity of heat produced by the flame tip region, thereby protecting components of the fuel cell system 30 from the flame tip region 80.

Figure 10:
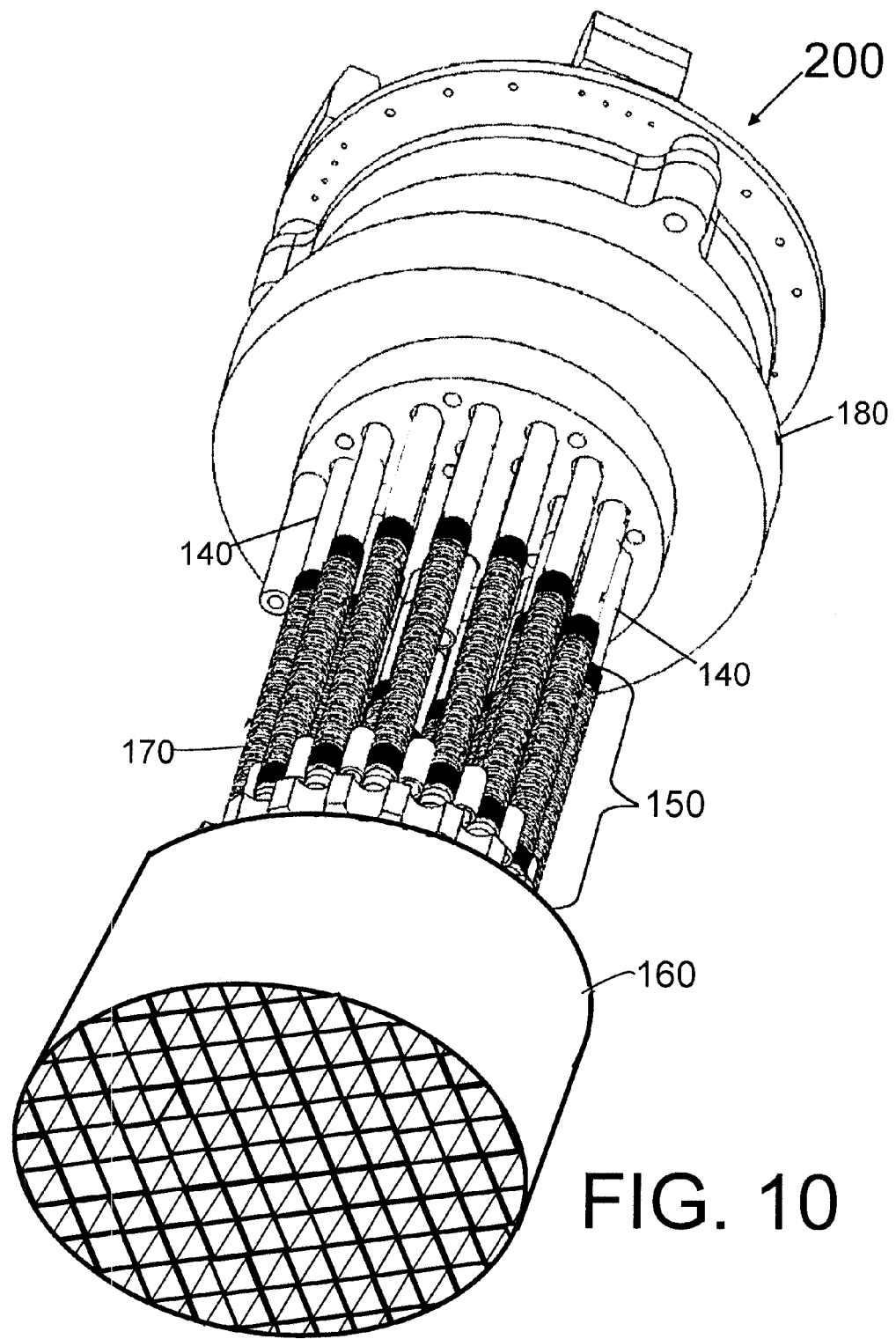
FIG. 10 depicts a prospective view of a fuel cell system in accordance with another exemplary embodiment of the present disclosure.
Figure 11:
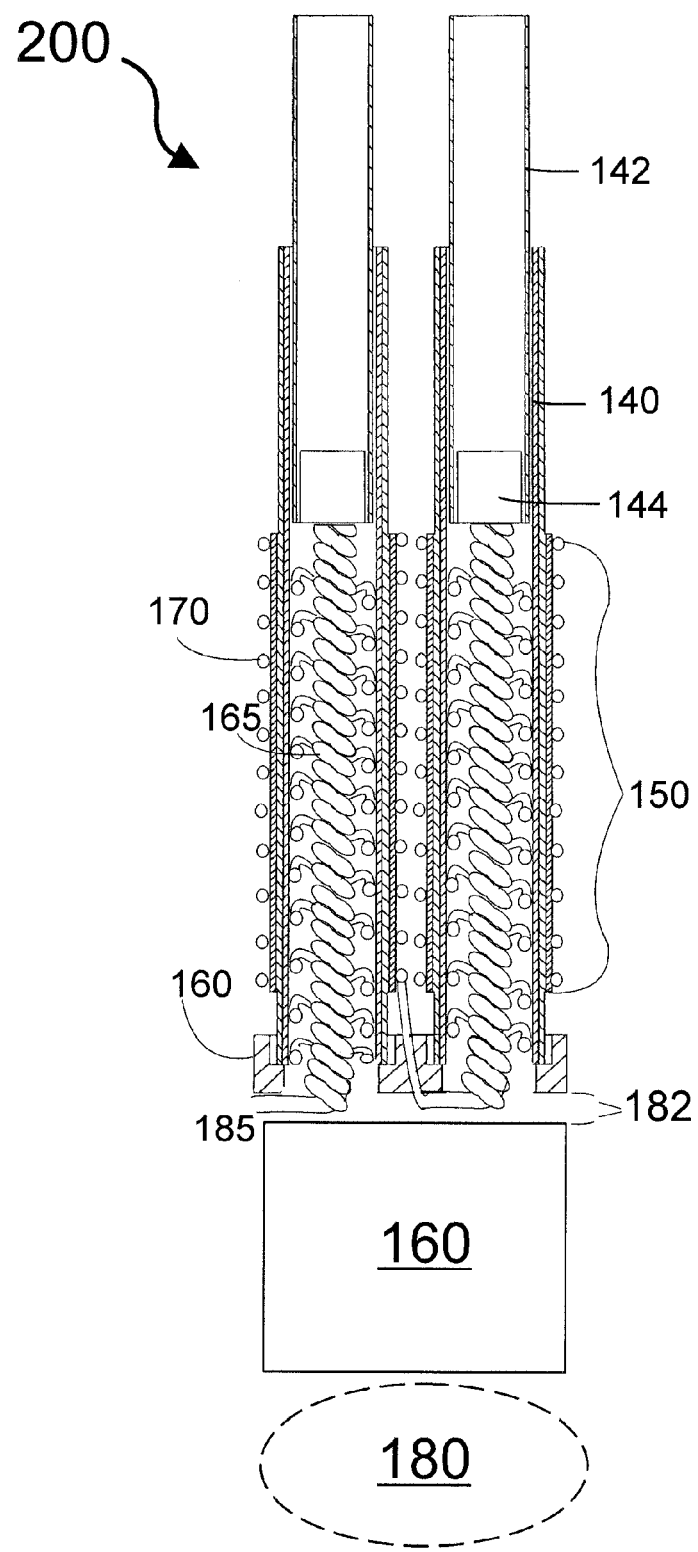
FIG. 11 depicts a cross sectional view of a portion of the fuel cell system in accordance with the exemplary embodiment of FIG. 11.

Referring to FIGS. 10 and 11, a fuel cell system 200 includes a plurality of fuel cells 140, a plurality of fuel feed tubes 142. The fuel cell 140 comprises an electrochemically active area 150. The active area 150 comprises the portion of the fuel cell 140 at which electromotive force is generated across an electrolyte and current is generated at an active portion of an anode layer. The fuel feed tube 142 has an internal reformer 144 disposed therein. In this embodiment, wherein like or corresponding parts are identified with like reference numbers offset by 100, the fuel cell system includes a current conduction member 170. Each fuel cell tube includes an anode current collector 165 and an interconnect member 185 substantially as described above.

The exemplary flame protection member is an extruded monolith configured to disperse exhaust fluid and route exhaust fluid through interior channels prior to delivering exhaust to the a flame tip region 180. The size of the gap 182 is such that unreacted fuel that exists the fuel cell tubes 140 is not allowed to significantly intermix with the oxygen outside the anode chamber prior to passing through the flame protection member 160. Therefore, the unreacted fuel does not significantly intermix with the oxygen to combust until reaching the flame tip region 180.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A solid oxide fuel cell system comprising:
 a fuel cell tube including anode and cathode layers disposed on opposite sides of an intermediate electrolyte layer, the fuel cell tube having an exhaust end, the exhaust end having a cross-sectional area, the fuel cell tube being configured to deliver a flow of combustible gas through the exhaust end to a downstream flame tip region generating a flame kernel;
 a flame protection member at least partially covering the exhaust end of the fuel cell tube, the flame protection member including a flame tip extending portion, and
 a current conduction member extending through the exhaust end of the fuel cell tube, the current conduction member routed through a conduit disposed through a side of the flame tip extending portion.

2. A solid oxide fuel cell system comprising:
 a first fuel cell tube including anode and cathode layers disposed on opposite sides of an intermediate electrolyte layer, the first fuel cell tube having an exhaust end, the first fuel cell tube having an inner cross-sectional area, the fuel cell tube being configured to deliver a flow of combustible gas through the exhaust end to a downstream flame tip region generating a flame kernel;
 a flame protection member at least partially covering the exhaust end of the first fuel cell tube, the flame protection member configured to inhibit at least one of mass transfer and heat transfer between the fuel cell tube and the flame tip region, the flame protection member defining a mass flux accelerating region having a cross-sectional area smaller than the cross-sectional area of the first fuel cell tube; and
 further including a current conduction member disposed through the exhaust end of the first fuel cell tube, the current conduction member routed through a conduit disposed through a side of the flame protection member upstream of the mass flux accelerating region.

3. The solid oxide fuel cell system of claim 2, wherein the flame protection member reroutes the flow direction combustible gas.

4. The solid oxide fuel cell system of claim 2, wherein the flame protection member disperses the combustible gas.

5. The solid oxide fuel cell system of claim 2, wherein the flame protection member comprises a plurality of output openings for routing gas therethrough.

6. The solid oxide fuel cell system of claim 2, wherein the flame protection member comprises at least one of a ceramic and a metal.

7. The solid oxide fuel cell system of claim 2, wherein the mass flux accelerating region is disposed within a flame tip extending portion of the flame protection member.

8. The solid oxide fuel cell of claim 2, wherein the flame protection member includes a ledge portion, the exhaust end of the first fuel cell tube being disposed in direct contact with the ledge portion.

9. The solid oxide fuel cell of claim 2, wherein the flame protection member includes an insertion flange to accommodate a joining member disposed about the exterior of the exhaust end of the first fuel cell tube.

10. The solid oxide fuel cell of claim 2, wherein the first fuel cell tube has an inner diameter at the exhaust end thereof, and wherein the flame protection member includes an exit hole, the exit hole having an inner dimension smaller than the inner diameter of the exhaust end to modify the flow velocity of the combustible gas.

11. The solid oxide fuel cell of claim 2, wherein the first fuel cell tube has an inner diameter at the exhaust end thereof, and wherein the flame protection member includes a plurality of exit holes, each of the exit holes having an inner dimension smaller than the inner diameter of the exhaust end.

12. The solid oxide fuel cell system of claim 2 further comprising:
 a second fuel cell tube electrically connected to the first fuel cell tube via a current conduction member.

13. The solid oxide fuel cell system of claim 2, further including a second fuel cell tube disposed adjacent the first fuel cell tube, and wherein the flame protection member substantially covers a surface at an exhaust end of the second fuel cell tube.

14. The solid oxide fuel cell system of claim 13, wherein the flame protection member provides structural support to the fuel cell system comprising the first and second fuel cell tubes.

15. The solid oxide fuel cell system of claim 2, further comprising:
   a second fuel cell tube electrically connected to the first fuel cell tube via an interconnect member extending through the flame protection member.

16. The solid oxide fuel cell of claim 15, wherein the flame protection member includes an exit hole through which the combustible gas flows, and wherein the interconnect member does not pass completely through the exit hole of the flame protection member.

* * * * *